(12) United States Patent
Terauchi et al.

(10) Patent No.: US 9,719,458 B2
(45) Date of Patent: Aug. 1, 2017

(54) FUEL INJECTION CONTROL DEVICE OF ENGINE AND FUEL INJECTION CONTROL METHOD OF ENGINE

(71) Applicant: NISSAN MOTOR CO., LTD., Yokohama-shi, Kanagawa (JP)

(72) Inventors: Kazumichi Terauchi, Kanagawa (JP); Shigehiro Yokoya, Kanagawa (JP); Akio Amano, Kanagawa (JP); Takatsugu Katayama, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/917,288

(22) PCT Filed: Sep. 9, 2013

(86) PCT No.: PCT/JP2013/074231
§ 371 (c)(1),
(2) Date: Mar. 8, 2016

(87) PCT Pub. No.: WO2015/033466
PCT Pub. Date: Mar. 12, 2015

(65) Prior Publication Data
US 2016/0215725 A1 Jul. 28, 2016

(51) Int. Cl.
*F02M 69/04* (2006.01)
*F02D 41/40* (2006.01)
(Continued)

(52) U.S. Cl.
CPC ......... *F02D 41/405* (2013.01); *F02D 41/182* (2013.01); *F02D 41/34* (2013.01);
(Continued)

(58) Field of Classification Search
CPC ....... F02D 2041/001; F02D 2200/0406; F02D 2200/0602; F02D 2200/703;
(Continued)

(56) References Cited

U.S. PATENT DOCUMENTS 5,485,824 A * 1/1996 Kondou ................. F02M 25/08
  123/520
5,560,340 A * 10/1996 Tomisawa .............. F02M 69/54
  123/494

(Continued)

FOREIGN PATENT DOCUMENTS

DE  19804677 A1  8/1999
JP  S59-49739 U  4/1984
(Continued)

*Primary Examiner* — Marguerite McMahon
*Assistant Examiner* — Tea Holbrook
(74) *Attorney, Agent, or Firm* — Drinker Biddle & Reath LLP

(57) ABSTRACT

A fuel injection control device of an engine is disclosed, that is provided with a fuel injection valve configured to inject a fuel according to a target pulse width into an intake passage, an intake flow rate detection unit arranged to detect a flow rate of an intake air supplied to the engine, an intake pressure detection unit arranged to detect an intake pressure in the intake passage, a fuel pressure detection unit arranged to detect a pressure of a fuel supplied to the fuel injection valve, and a pressure control unit configured to control the fuel pressure according to an engine operation state. The device is further provided with a request pulse width calculation unit configured to calculate a request pulse width on the basis of an intake flow rate detected by the intake flow rate detection unit, a fuel pressure detected by the fuel pressure detection unit, and a differential pressure between the fuel pressure and an intake pressure detected by the intake pressure detection unit, a post-correction request pulse width calculation unit configured to calculate a post- (Continued)

correction request pulse width through correcting the request pulse width according to the differential pressure, when injecting a fuel of which flow rate is lower than a predetermined flow rate; and a target pulse width setting unit configured to set the target pulse width on the basis of the post-correction request pulse width.

6 Claims, 10 Drawing Sheets

(51) Int. Cl.
    *F02D 41/18* (2006.01)
    *F02D 41/34* (2006.01)
    *F02D 41/00* (2006.01)

(52) U.S. Cl.
    CPC ............... *F02D 2041/001* (2013.01); *F02D 2200/0406* (2013.01); *F02D 2200/0602* (2013.01); *F02D 2200/703* (2013.01); *F02D 2250/31* (2013.01); *Y02T 10/44* (2013.01)

(58) Field of Classification Search
    CPC .... F02D 2250/31; F02D 41/182; F02D 41/34; F02D 41/405; Y02T 10/44
    USPC .......... 123/445, 457, 478, 480, 495
    See application file for complete search history.

(56) References Cited

U.S. PATENT DOCUMENTS

| | | | | |
|---|---|---|---|---|
| 5,615,657 | A * | 4/1997 | Yoshizawa | F02D 41/32 123/478 |
| 2001/0003975 | A1* | 6/2001 | Nakamura | F02D 41/3082 123/464 |
| 2001/0023683 | A1* | 9/2001 | Nakamura | F02D 41/042 123/457 |
| 2003/0192508 | A1* | 10/2003 | Kishimoto | F02D 33/006 123/447 |
| 2003/0217732 | A1* | 11/2003 | Kataoka | F02B 1/12 123/276 |
| 2009/0043481 | A1* | 2/2009 | Ootake | F01N 3/2006 701/103 |
| 2010/0168989 | A1* | 7/2010 | Gao | F02D 41/2422 701/110 |
| 2011/0186013 | A1* | 8/2011 | Sasaki | F02D 41/0025 123/445 |
| 2011/0295488 | A1 | 12/2011 | Ramappan et al. | |
| 2016/0215725 | A1* | 7/2016 | Terauchi | F02D 41/182 |

FOREIGN PATENT DOCUMENTS

| | | | |
|---|---|---|---|
| JP | H08-100695 A | 4/1996 | |
| JP | H09-209803 A | 8/1997 | |
| JP | H11-343948 A | 12/1999 | |
| JP | WO 2015033466 A1 * | 3/2015 | ........... F02D 41/182 |

* cited by examiner

FUEL INJECTION CONTROL DEVICE OF ENGINE AND FUEL INJECTION CONTROL METHOD OF ENGINE

TECHNICAL FIELD

The present invention relates to a fuel injection control device of an engine and a fuel injection control method of the engine.

BACKGROUND ART

JP1996-100695A discloses a fuel injection control device of an engine for controlling operation of a fuel injection valve that makes fuel injection into an intake passage. In consideration of an influence of an intake pressure in the intake passage exerted on a fuel injection amount of the fuel injection valve, this fuel injection control device calculates an effective injection time and an ineffective injection time based on a differential pressure between a fuel pressure and the intake pressure, and sets an injection time of the fuel injection valve from the effective injection time and the ineffective injection time.

SUMMARY OF INVENTION

Incidentally, the fuel injection valve that is mounted on the engine is controlled to open according to a target pulse width that defines a valve-opening time, and basically, the target pulse width is linearly proportional to an injection flow rate of a fuel injected from the fuel injection valve. In other words, as the target pulse width increases, the flow rate of the fuel injected from the fuel injection valve increases.

With JP1996-100695A, consideration is given to setting of the target pulse width according to the differential pressure between the fuel pressure and the intake pressure, but no consideration is given to an influence of using a variable fuel pressure system in particular, by which the fuel pressure is varied actively. According to the above-described fuel injection control device, optimum fuel injection with regard to an engine operation state cannot be made, and deterioration in fuel consumption performance and exhaust performance may be caused especially in a region where the fuel injection flow rate of the fuel injection valve is low.

It is an object of the present invention to provide a fuel injection control device of an engine, capable of realizing optimum fuel injection to an engine operation state.

According to an aspect of the present invention, a fuel injection control device of an engine is provided. The fuel injection control device includes a fuel injection valve configured to inject a fuel according to a target pulse width into an intake passage, an intake flow rate detection unit arranged to detect a flow rate of an intake air supplied to the engine, an intake pressure detection unit arranged to detect an intake pressure in the intake passage, a fuel pressure detection unit arranged to detect a pressure of a fuel supplied to the fuel injection valve, and a pressure control unit configured to control the fuel pressure according to an engine operation state. Furthermore, the fuel injection control device includes a request pulse width calculation unit configured to calculate a request pulse width on the basis of an intake flow rate detected by the intake flow rate detection unit, a fuel pressure detected by the fuel pressure detection unit, and a differential pressure between the fuel pressure and an intake pressure detected by the intake pressure detection unit, a post-correction request pulse width calculation unit configured to calculate a post-correction request pulse width through correcting the request pulse width according to the differential pressure, when injecting a fuel of which flow rate is lower than a predetermined flow rate; and a target pulse width setting unit configured to set the target pulse width on the basis of the post-correction request pulse width.

DESCRIPTION OF EMBODIMENTS

Hereinafter, a fuel injection control device 100 of an engine 1 according to an embodiment of the present invention will be explained with reference to FIG. 1 to FIG. 10.

Figure 1:
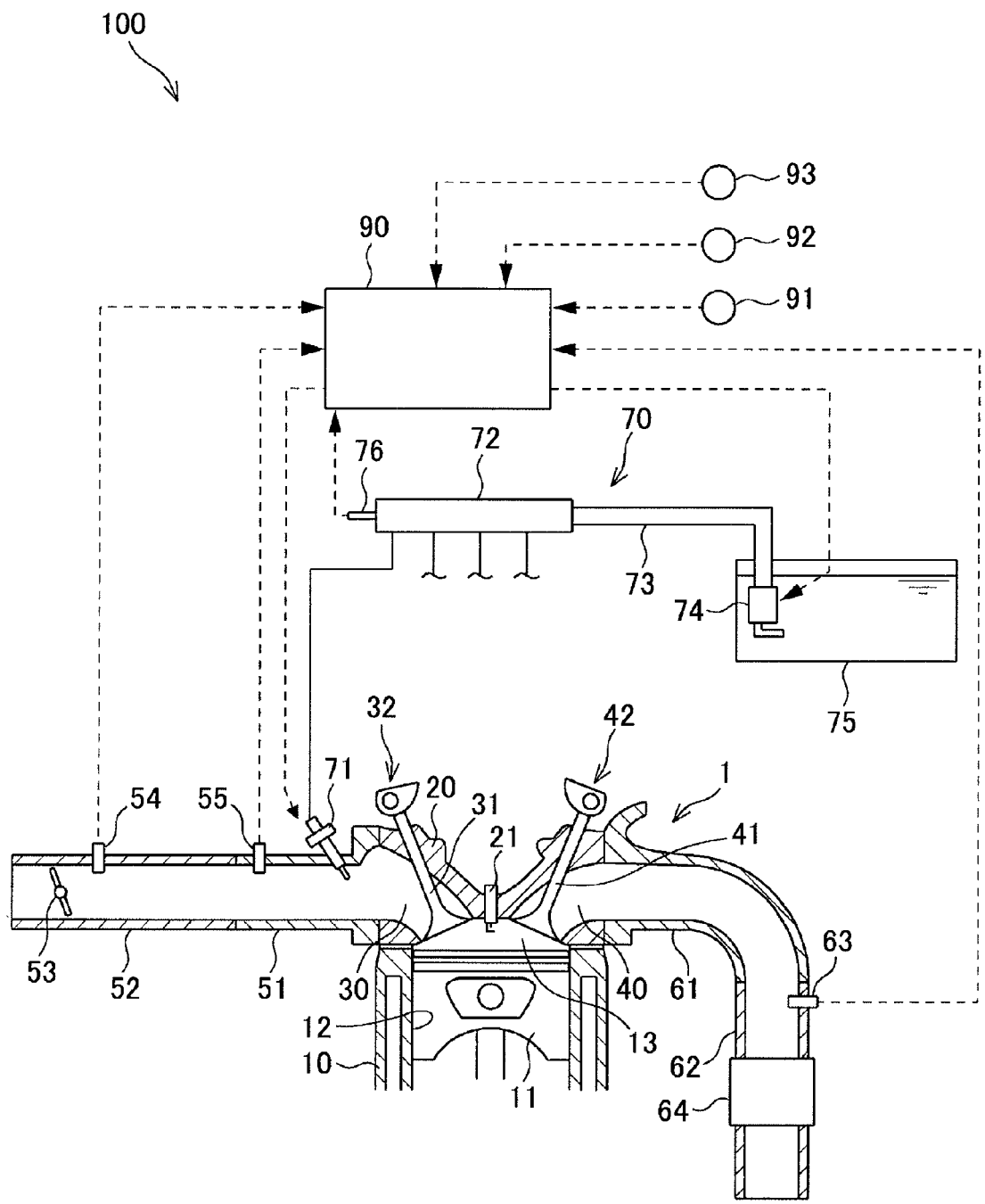
FIG. 1 is a schematic diagram illustrating the structure of a fuel injection control device of an engine according to an embodiment of the present invention.

As illustrated in FIG. 1, the fuel injection control device 100 is provided with the engine 1 and a controller 90 for controlling the engine 1.

The engine 1 is, for example, a serial 4-cylinder internal combustion engine that is mounted on a vehicle. The engine 1 is provided with a cylinder block 10 and a cylinder head 20 that is fixed to the upper portion of the cylinder block 10.

A cylinder 12 that receives a piston 11 in a slidable manner is formed in the cylinder block 10. The crown surface of the piston 11, the wall surface of the cylinder 12, and the bottom surface of the cylinder head 20 form a combustion chamber 13. When an air-fuel mixture is burned in the combustion chamber 13, the piston 11 receives a combustion pressure by the burning, and moves vertically along the cylinder 12.

An intake port 30 and an exhaust port 40 that communicate with the combustion chamber 13 are formed in the cylinder head 20. Two intake ports 30 and two exhaust ports 40 are provided for each combustion chamber 13.

An intake valve 31 is provided at the intake port 30. The intake valve 31 is driven by a rocker cam of a variable valve mechanism 32, and opens and closes the intake port 30 in response to the vertical movement of the piston 11. The variable valve mechanism 32 is configured to be able to change valve characteristics of the intake valve 31, such as a lift amount and an operating angle.

An exhaust valve 41 is provided at the exhaust port 40. The exhaust valve 41 is driven by a rocker cam of a variable valve mechanism 42, and opens and closes the exhaust port 40 in response to the vertical movement of the piston 11. The variable valve mechanism 42 is configured to be able to change valve characteristics of the exhaust valve 41, such as a lift amount and an operating angle.

An ignition plug 21 is installed on the cylinder head 20 between the intake port 30 and the exhaust port 40. One ignition plug 21 is allocated to each cylinder of the engine 1. The ignition plug 21 ignites the air-fuel mixture in the combustion chamber 13 at predetermined timing.

An intake manifold 51 is connected to the intake port 30 for distributing intake air to each cylinder of the engine 1. Furthermore, an intake pipe 52 that flows an intake air taken from the outside is connected to the upstream end of the intake manifold 51. The intake manifold 51 and the intake pipe 52 function as an intake passage that guides the intake air to the engine 1. An intake pressure sensor 55, which corresponds to an intake pressure detection unit in this embodiment, is provided in the intake manifold 51 for detecting a pressure of the intake air in the intake manifold 51 (or the intake passage).

A throttle valve 53 is disposed in the intake pipe 52. The throttle valve 53 adjusts an intake amount to be introduced to the combustion chamber 13 by changing an intake flow area of the intake pipe 52. Furthermore, an air flow meter 54 is provided in the intake pipe 52 at the position downstream of the throttle valve 53. The air flow meter 54, which corresponds to an intake flow rate detection unit in this embodiment, detects a flow rate of the intake air that passes through the throttle valve 53 to be supplied to the engine 1.

An exhaust manifold 61 is connected to the exhaust port 40 for collecting exhaust gas from each cylinder of the engine 1. An exhaust pipe 62 is connected to the downstream end of the exhaust manifold 61. The exhaust manifold 61 and the exhaust pipe 62 function as an exhaust passage that guides the exhaust gas, discharged from the engine 1, to the outside.

In the exhaust pipe 62, an air-fuel ratio sensor 63 and a catalyst converter 64 are provided in order from the upstream side. The air-fuel ratio sensor 63 detects oxygen concentration in the exhaust gas flowing through the exhaust pipe 62. The catalyst converter 64 has a three-way catalyst and purifies a hydrocarbon, a carbon monoxide, and a nitrogen oxide in the exhaust gas.

Fuel is supplied by a fuel supply device 70 to the engine 1. The fuel supply device 70 is provided with a plurality of fuel injection valves 71, one fuel pipe 72 that is connected to the respective fuel injection valves 71, a supply passage 73 that allows the fuel pipe 72 and a fuel tank 75 to communicate, and a fuel pump 74 that sucks the fuel inside the fuel tank 75 and forcibly feeds the fuel.

The fuel injection valve 71 is provided in the intake manifold 51 for each cylinder of the engine 1. Namely, one fuel injection valve 71 is provided for each branch pipe of the intake manifold 51. The fuel in an amount corresponding to an engine operation state is injected into the intake manifold 51 at predetermined timing by the fuel injection valve 71. The fuel to be supplied to the fuel injection valve 71 is stored in the fuel tank 75.

The fuel stored in the fuel tank 75 is forcibly fed by the fuel pump 74 provided in the fuel tank 75. The fuel, discharged from the fuel pump 74, is guided to the fuel pipe 72 via the supply passage 73, and supplied from the fuel pipe 72 to each fuel injection valve 71.

The fuel pump 74 is configured as a variable capacity pump capable of changing a pump discharge capacity according to the engine operation state. In the engine 1, it is possible to freely set the pressure of the fuel supplied to the fuel injection valve 71 by controlling the discharge capacity of the fuel pump 74. Thus, the fuel pump 74 functions as a pressure control unit that controls the fuel pressure according to the engine operation state. A fuel pressure sensor 76, which corresponds to a fuel pressure detection unit in this embodiment, is provided in the fuel pipe 72 for detecting the pressure of the fuel inside the fuel pipe 72, that is, the pressure of the fuel supplied to the fuel injection valve 71.

Incidentally, a filter can be provided in the supply passage 73 of the fuel supply device 70 for removing foreign matters contained in the fuel passing therethrough.

A target pulse width and injection timing of the fuel injection valve 71, ignition timing of the ignition plug 21, an opening degree of the throttle valve 53, the valve characteristics of the intake valve 31 and the exhaust valve 41, a discharge capacity of the fuel pump 74 and the like are controlled by the controller 90. The controller 90 is formed by a microcomputer including a central processing unit (CPU), read-only memory (ROM), random access memory (RAM), and an input/output interface (I/O interface). The controller 90 can be composed of a plurality of microcomputers.

Detection signals from a battery voltage sensor 91, a crank angle sensor 92, and an accelerator pedal sensor 93, as well as signals from the air flow meter 54, the intake pressure sensor 55, the air-fuel ratio sensor 63, and the fuel pressure sensor 76 are inputted to the controller 90.

The battery voltage sensor 91 is a sensor that detects a voltage of a battery (not illustrated) mounted on the vehicle. Power of the battery is used for driving electrical components that accompany the engine 1, such as the fuel injection valve 71, the fuel pump 74, and the like.

The crank angle sensor 92 is a sensor that generates a crank angle signal for each predetermined crank angle. The crank angle signal is used as a signal that represents engine rotation speed of the engine 1. Furthermore, the accelerator pedal sensor 93 is a sensor that detects a depressing amount of an accelerator pedal mounted on the vehicle. The depressing amount of the accelerator pedal is used as a signal that represents an engine load of the engine 1. The crank angle sensor 92 and the accelerator pedal sensor 93 function as an operation state detection unit that detects an operation state of the engine 1.

Figure 2:
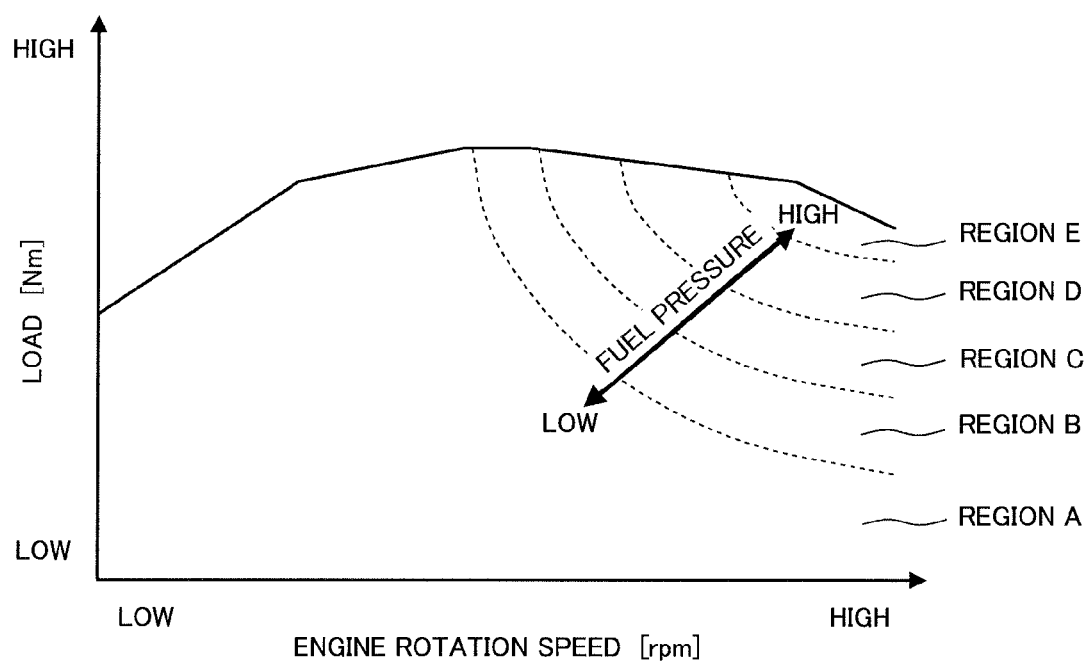
FIG. 2 is a view illustrating the relationship between an engine operation state and a fuel pressure.

With the engine 1 as described thus far, the discharge capacity of the fuel pump 74 is controlled, and the pressure of the fuel supplied to the fuel injection valve 71 is changed, according to the engine operation state. FIG. 2 is an operation map illustrating the relationship between the engine operation state and the fuel pressure.

As illustrated in FIG. 2, the fuel pressure is set to be higher as the engine rotation speed and the engine load increase. Namely, in an operation region A, the fuel pressure is set to be the lowest, and in an operation region E, the fuel pressure is set to be the highest. With the engine 1, the fuel pressure is changed in a range of several hundreds of kPa in the operation regions A to E.

With the engine 1 according to this embodiment, the fuel pressure in the operation regions C to E is set to be higher than that of the conventionally-known engine that makes injection of the fuel into the intake passage. As the fuel pressure is increased at the high engine rotation speed and at the high engine load like this, it is possible to facilitate atomization of the fuel, and to make injection of the predetermined amount of the fuel without leaving the fuel unused. As a result of this, it is possible to realize the appropriate fuel injection with regard to the engine operation state, and to improve fuel consumption performance and exhaust performance.

It is known that, with the engine 1 that makes injection of the fuel into the intake manifold 51 as described above, the pressure of the fuel supplied to the fuel injection valve 71 and the pressure of the intake air in the intake manifold 51 affect a fuel injection amount of the fuel injection valve 71. Namely, when a differential pressure between the fuel pressure in the fuel injection valve 71 and the intake pressure in the intake manifold 51 increases, the fuel injection from the fuel injection valve 71 can be easily made. On the other hand, when the differential pressure decreases, the fuel injection from the fuel injection valve 71 is difficult.

According to this embodiment, giving consideration to the differential pressure between the fuel pressure in the fuel injection valve 71 and the intake pressure in the intake manifold 51, the fuel injection control device 100 of the engine 1 is so configured that optimum fuel injection can be performed with regard to the engine operation state.

Figure 3:
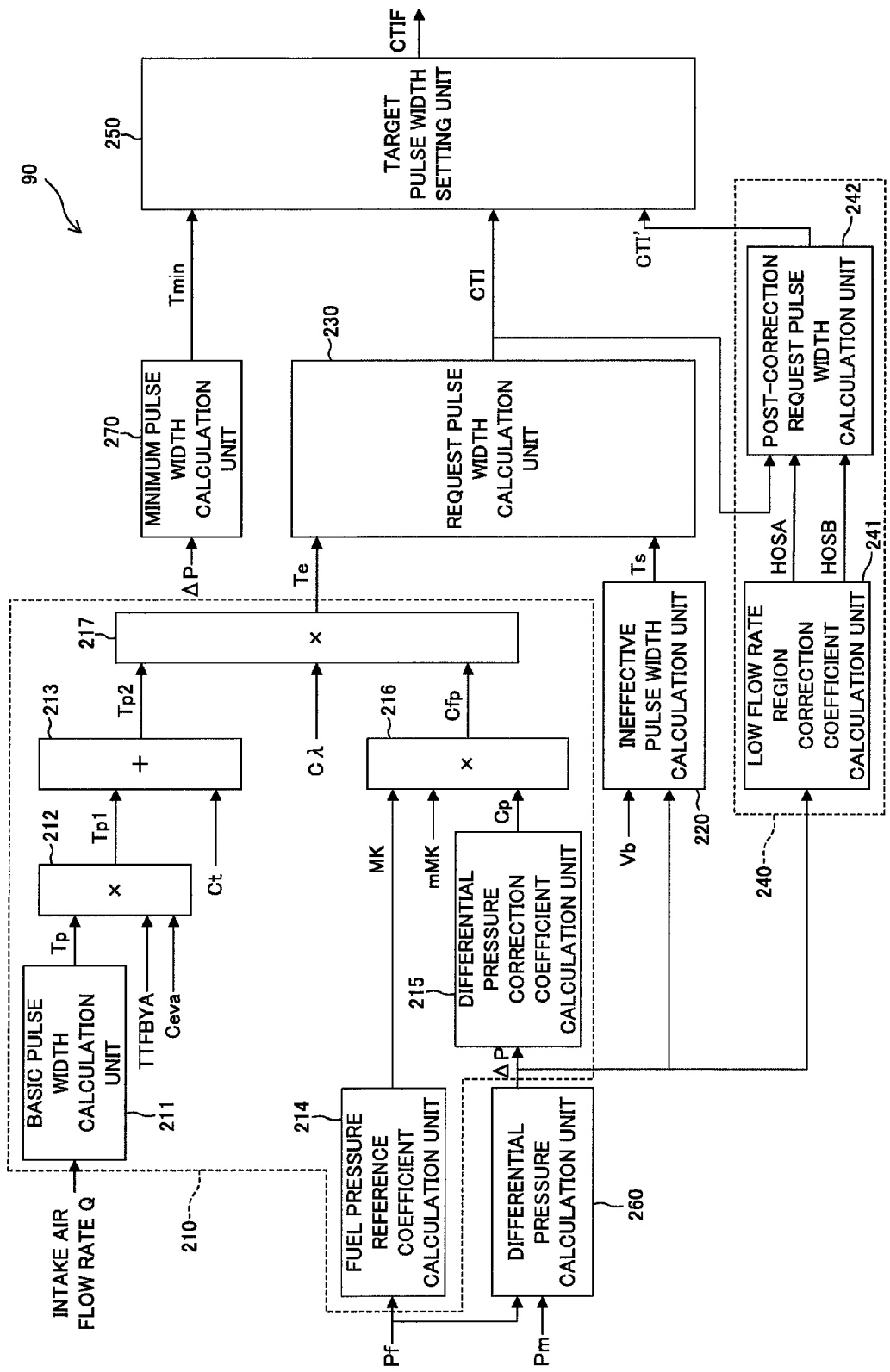
FIG. 3 is a block diagram of a controller for setting a target pulse width of a fuel injection valve.

Referring to FIG. 3, the structure of the controller 90 that executes setting processing of the target pulse width of the fuel injection valve 71 will be explained. The target pulse width is a control parameter that defines a valve-opening time of the fuel injection valve 71 and, as the target pulse width increases, a flow rate of the fuel injected from the fuel injection valve 71 (injection amount) increases.

As illustrated in FIG. 3, the controller 90 is provided with an effective pulse width calculation unit 210 that calculates an effective pulse width Te, an ineffective pulse width calculation unit 220 that calculates an ineffective pulse width Ts, a request pulse width calculation unit 230 that calculates a request pulse width CTI based on the effective pulse width Te, a pulse correction unit 240 that calculates a post-correction request pulse width CTI' by correcting the request pulse width CTI, and a target pulse width setting unit 250 that sets a target pulse width CTIF based on the post-correction request pulse width CTI'.

The effective pulse width calculation unit 210 calculates the effective pulse width Te based on the intake flow rate, the fuel pressure, and the differential pressure between the fuel pressure and the intake pressure. The effective pulse width Te is a parameter for defining a time period during which the fuel injection valve 71 actually opens. The effective pulse width calculation unit 210 is composed of various calculation units 211 to 217.

A basic pulse width calculation unit 211 in the effective pulse width calculation unit 210 calculates a basic pulse width Tp based on an intake flow rate Q detected by the air flow meter 54.

A multiplier unit 212 calculates a first basic pulse width Tp1 by multiplying the basic pulse width Tp, a target equivalent ratio TTFBYA, and a pulse width correction coefficient Ceva with consideration given to fuel evaporation in the fuel tank 75.

An adder unit 213 calculates a second basic pulse width Tp2 by adding a pulse width correction coefficient Ct, with consideration given to a transitional operation state such as when accelerating the vehicle, to the first basic pulse width Tp1. The second basic pulse width Tp2 is used in a multiplier unit 217 that will be described later.

Furthermore, in the effective pulse width calculation unit 210, a pulse width correction coefficient Cfp, with consideration given to a pressure state applied to the fuel injection valve 71, that is, the differential pressure between the fuel pressure and the intake pressure, is calculated by a fuel pressure reference coefficient calculation unit 214, a differential pressure correction coefficient calculation unit 215, and a multiplier unit 216.

The fuel pressure reference coefficient calculation unit 214 calculates a fuel pressure reference coefficient MK based on a fuel pressure Pf detected by the fuel pressure sensor 76. The fuel pressure reference coefficient calculation unit 214 determines the fuel pressure reference coefficient MK by referring to a fuel pressure reference coefficient calculation map of FIG. 4. The fuel pressure reference coefficient calculation map is stored in the ROM of the controller 90.

Figure 4:
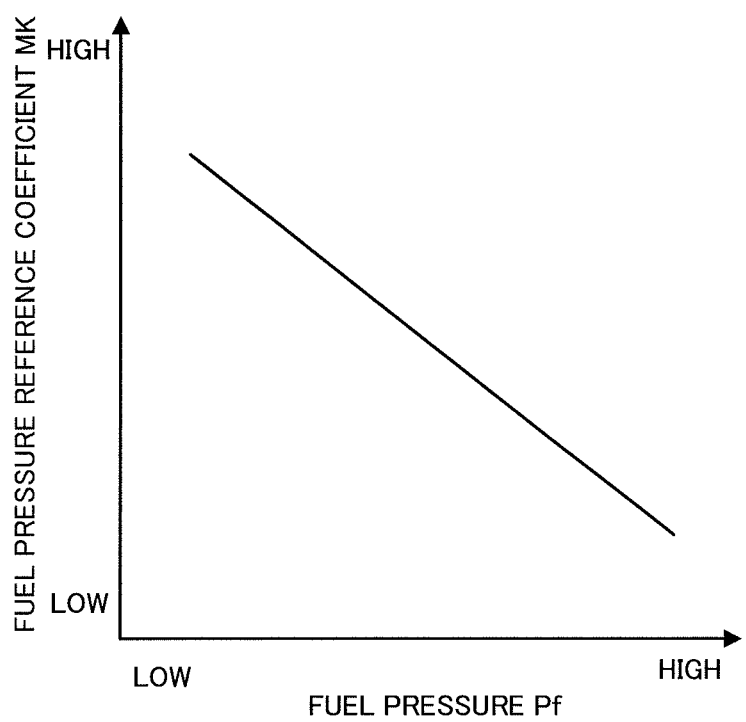
FIG. 4 is a view illustrating the relationship between the fuel pressure and a fuel pressure reference coefficient.

As illustrated in FIG. 4, the fuel pressure reference coefficient MK is set to be lower as the fuel pressure Pf becomes higher. This is because the flow rate of the fuel injected from the fuel injection valve 71 becomes higher as the fuel pressure Pf becomes higher, and the pulse width (fuel injection time) required for the same intake amount becomes smaller as compared with the case where the fuel pressure is lower.

As illustrated in FIG. 3, the differential pressure correction coefficient calculation unit 215 calculates a differential pressure correction coefficient Cp based on a differential pressure $\Delta P$. The differential pressure $\Delta P$ is calculated by a differential pressure calculation unit 260 provided in the controller 90. The differential pressure $\Delta P$ is calculated based on the fuel pressure Pf detected by the fuel pressure sensor 76, and an intake pressure Pm detected by the intake pressure sensor 55. It should be noted that, when the pressure indicated by the fuel pressure sensor 76 or the like is a gage pressure, the differential pressure $\Delta P$ is calculated based on the atmospheric pressure detected by an atmospheric pressure sensor that is provided separately in the engine 1, the fuel pressure Pf, and the intake pressure Pm.

Figure 5:
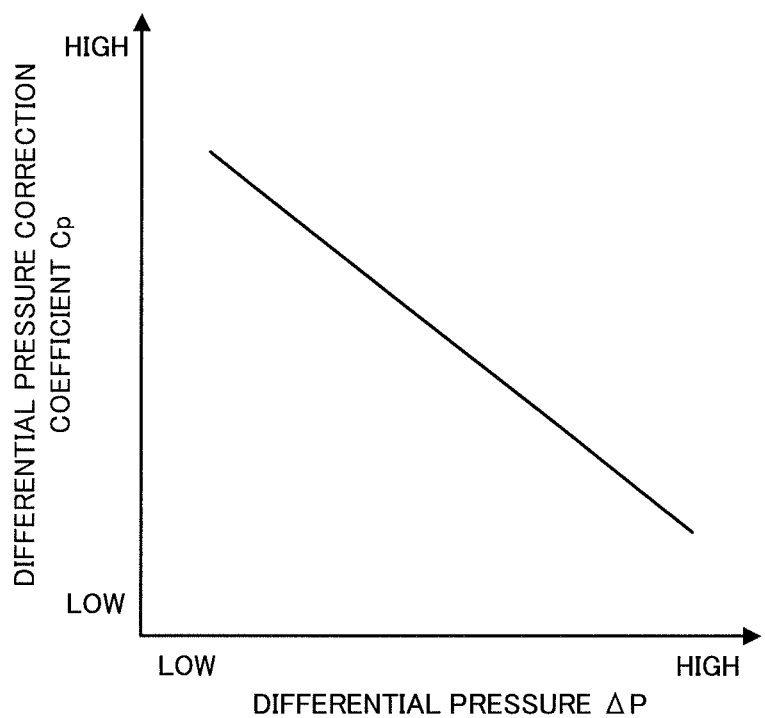
FIG. 5 is a view illustrating the relationship between a differential pressure, between the fuel pressure and an intake pressure, and a differential pressure correction coefficient.

The differential pressure correction coefficient calculation unit 215 determines the differential pressure correction coefficient Cp by referring to a differential pressure correction coefficient calculation map of FIG. 5. The differential pressure correction coefficient calculation map is stored in the ROM of the controller 90.

As illustrated in FIG. 5, the differential pressure correction coefficient Cp calculated by the differential pressure correction coefficient calculation unit 215 is set to be lower as the differential pressure $\Delta P$ becomes higher. This is because, as the differential pressure $\Delta P$ becomes higher, the fuel injection from the fuel injection valve 71 can be easily made and the fuel injection flow rate becomes higher, and hence the pulse width (fuel injection time) required for the same intake amount becomes smaller as compared with the case where the differential pressure is lower.

As illustrated in FIG. 3, the multiplier unit 216 calculates the pulse width correction coefficient Cfp, with consideration given to the pressure state applied to the fuel injection valve 71, by multiplying the fuel pressure reference coefficient MK, the differential pressure correction coefficient Cp, and a fixed value mMK that is determined in advance as an eigenvalue for each fuel injection valve 71.

The multiplier unit 217 calculates the effective pulse width Te by multiplying the second basic pulse width Tp2 that is calculated by the adder unit 213, the pulse width correction coefficient Cfp that is calculated by the multiplier unit 216, and a pulse width correction coefficient $C_\lambda$ that is determined according to a control state of air-fuel ratio feedback control executed based on a detected value of the air-fuel ratio sensor 63.

As described above, the effective pulse width calculation unit 210 calculates the effective pulse width Te by correcting the basic pulse width Tp, calculated from the intake flow rate Q, with the various correction coefficients. When considering the pressure state applied to the fuel injection valve 71 only, it is possible to arrange the effective pulse width calculation unit 210 in such a manner that it calculates the effective pulse width Te by multiplying the basic pulse width Tp, the fuel pressure reference coefficient MK calculated based on the fuel pressure Pf, and the differential pressure correction coefficient Cp calculated based on the differential pressure ΔP.

The ineffective pulse width calculation unit 220 in the controller 90 calculates the ineffective pulse width Ts based on the differential pressure ΔP calculated by the differential pressure calculation unit 260 and a battery voltage Vb detected by the battery voltage sensor 91. The ineffective pulse width Ts is a parameter that represents a response delay from the time when a valve-opening signal is applied to the fuel injection valve 71 until the time when the fuel injection valve 71 actually opens.

Figure 6:
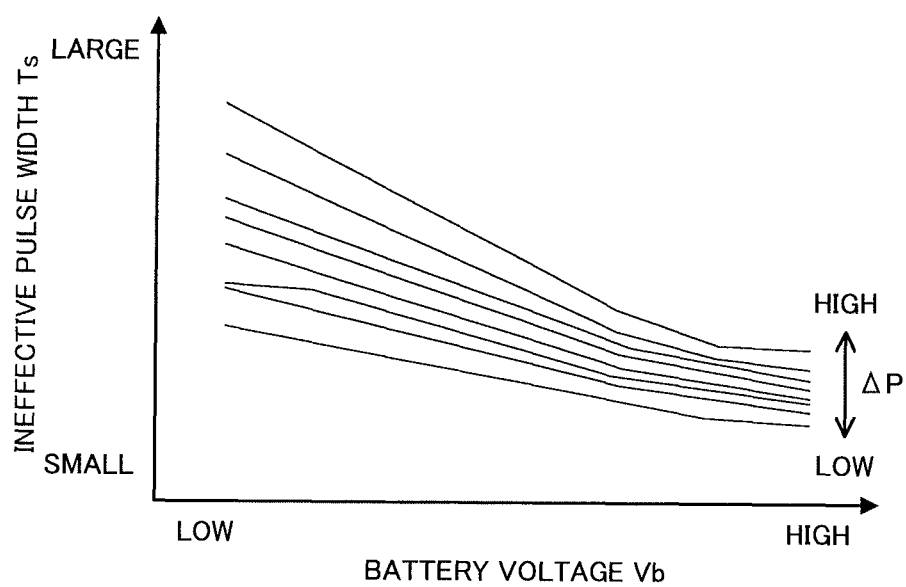
FIG. 6 is a view illustrating the relationship between a battery voltage and an ineffective pulse width.

The ineffective pulse width calculation unit 220 determines the ineffective pulse width Ts by referring to an ineffective pulse width calculation map of FIG. 6. The ineffective pulse width calculation map is stored in the ROM of the controller 90.

As illustrated in FIG. 6, a characteristic line, illustrating the relationship between the battery voltage Vb and the ineffective pulse width Ts, is defined for each differential pressure ΔP. As illustrated by each characteristic line, the ineffective pulse width Ts is set to be greater as the battery voltage Vb becomes smaller. In the case where the battery voltage Vb is the same, the ineffective pulse width Ts is set to be greater as the differential pressure ΔP becomes higher.

Thus-calculated ineffective pulse width Ts is outputted to the request pulse width calculation unit 230 illustrated in FIG. 3, together with the effective pulse width Te calculated by the effective pulse width calculation unit 210.

The request pulse width calculation unit 230 calculates the request pulse width CTI by adding the ineffective pulse width Ts to the effective pulse width Te. Thus-calculated request pulse width CTI is used in the target pulse width setting unit 250 and the pulse correction unit 240 that will be described later. Incidentally, the request pulse width calculation unit 230 can be configured to calculate the effective pulse width Te as the request pulse width, without any change, in the case where the ineffective pulse width Ts can be ignored, such as where the ineffective pulse width Ts is extremely small.

Next, the pulse correction unit 240 of the controller 90 will be explained.

The pulse correction unit 240 is provided for executing pulse width correction in a low flow rate region, in which the flow rate of the fuel injected from the fuel injection valve 71 is lower than a reference flow rate. Incidentally, the reference flow rate is a value determined in advance through experiments and the like, for each fuel injection valve 71.

Figure 7:
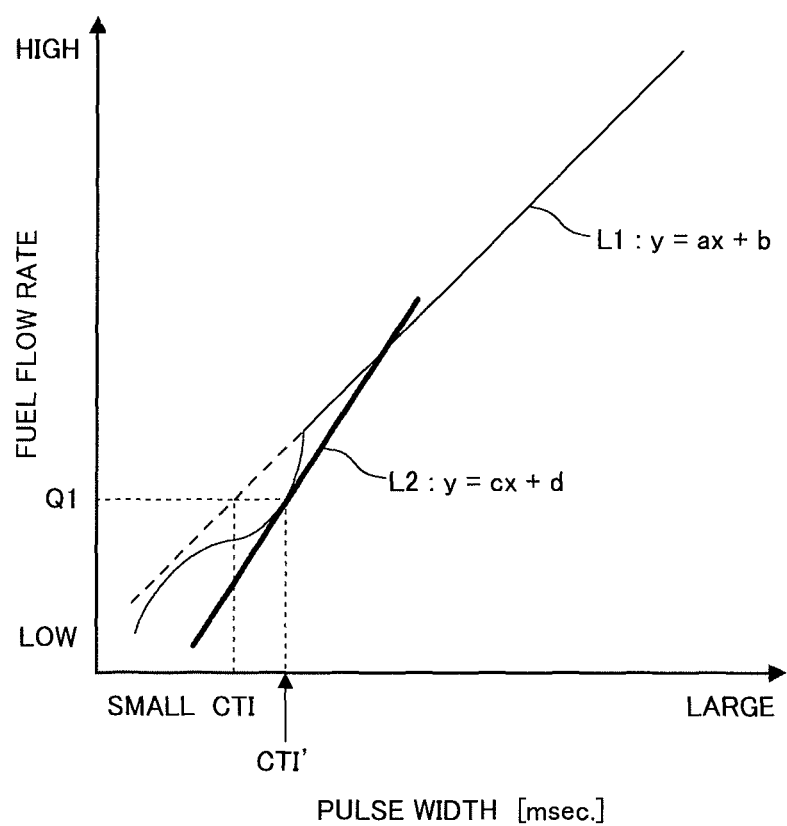
FIG. 7 is a view illustrating the relationship between the target pulse width and a fuel injection flow rate.

Referring to FIG. 7, a concept of the pulse width correction in the low flow rate region, executed by the controller 90, will be explained.

As illustrated by a line L1 in FIG. 7, the fuel injection valve 71 is controlled to open according to the pulse width, and basically, the pulse width is linearly proportional to the flow rate of the fuel injected from the fuel injection valve 71. However, in the low flow rate region where the pulse width (request pulse width, for example) becomes smaller than a reference value and the fuel flow rate becomes lower than the reference flow rate, the relationship between the pulse width and the fuel flow rate deviates from the linear relationship as illustrated by a broken line portion of L1 to the nonlinear relationship as illustrated by a solid line portion of L1. In such a region, even when the pulse width is set as CTI in order to obtain a fuel flow rate Q1, for example, the flow rate of the fuel actually injected from the fuel injection valve 71 does not become Q1. In order to set the flow rate of the fuel injected from the fuel injection valve 71 as Q1, it is necessary to correct the pulse width from CTI to CTI'.

It has been conventionally known that the fuel injection valve 71 has the nonlinear region like this, but no consideration has been given to an influence of the differential pressure, especially to an influence of variability of the fuel pressure. Namely, the fact that the differential pressure between the fuel pressure and the intake pressure affects the fuel injection amount, with respect to the pulse width, of the fuel injection valve 71 has been disclosed in the conventional art, and the differential pressure between the fuel pressure and the intake pressure has been used for correcting the effective pulse width. However, the differential pressure between the fuel pressure and the intake pressure has not been used for the correction in the nonlinear region of the flow rate of the fuel injected from the fuel injection valve 71.

A variable width of the intake pressure is about 100 kPa, from an atmospheric pressure to a vacuum, and thus the variable width of the differential pressure is approximately within the range of 100 kPa, unless the fuel pressure is varied actively. Thus, the influence of the differential pressure is smaller as compared with the level of the flow rate of the fuel injected from the fuel injection valve 71, and hence the influence of the differential pressure has not been recognized as a problem.

According to the engine 1 of this embodiment, however, the influence of the differential pressure is not ignorable, because the fuel pressure is changed in the range of several hundreds of kPa in the operation regions and the variations in the differential pressure corresponding to the variations in the fuel pressure are large. Therefore, the correction based on the differential pressure between the fuel pressure and the intake pressure is executed, together with the correction according to the flow rate of the fuel to be injected, as will be described below.

The calculation of the post-correction pulse width by the pulse width correction is made based on a tangent L2 that passes through the fuel flow rate Q1 and comes in contact with a curved portion of L1 in the nonlinear region. Here, the line L1 is supposed to be a line represented by y=ax+b, and the line L2 is supposed to be a line represented by y=cx+d. In this case, the post-correction pulse width CTI', for obtaining the fuel flow rate Q1, can be found by the following expression (1) by using the pre-correction pulse width CTI.

$$CTI' = \frac{a}{c} \times CTI + \frac{b-d}{c} \quad (1)$$

The coefficient of the first term in the right side in the expression (1) corresponds to a first correction coefficient HOSA that is calculated by the pulse correction unit 240 of FIG. 3, and a coefficient of the second term in the right side corresponds to a second correction coefficient HOSB that is calculated by the pulse correction unit 240. Thus, in the low flow rate region, the pulse width correction using the first correction coefficient HOSA and the second correction coefficient HOSB is executed.

As illustrated in FIG. 3, the pulse correction unit 240 is composed of a low flow rate region correction coefficient calculation unit 241, and a post-correction request pulse width calculation unit 242.

The low flow rate region correction coefficient calculation unit 241 calculates the above-described first correction coefficient HOSA and second correction coefficient HOSB, based on the differential pressure ΔP calculated by the differential pressure calculation unit 260. According to this embodiment, the fuel pressure is changed in the range of several hundreds of kPa according to the operation state, and the intake pressure also changes according to the operation state, and therefore, the first correction coefficient HOSA and the second correction coefficient HOSB are determined in consideration of the differential pressure ΔP between the fuel pressure and the intake pressure.

Figure 8:
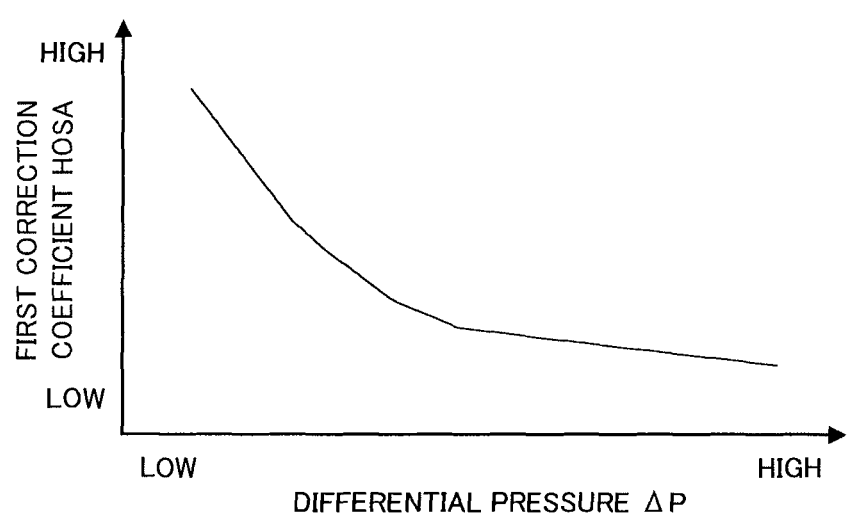
FIG. 8 is a view illustrating the relationship between the differential pressure, between the fuel pressure and the intake pressure, and a first correction coefficient.

The low flow rate region correction coefficient calculation unit 241 calculates the first correction coefficient HOSA by referring to a first correction coefficient calculation map of FIG. 8. The first correction coefficient calculation map is stored in the ROM of the controller 90.

As illustrated in FIG. 8, the first correction coefficient HOSA is set to be lower as the differential pressure ΔP becomes higher. FIG. 8 shows an example of the first correction coefficient calculation map, and it is possible to use a first correction coefficient calculation map of which characteristics are different from those of FIG. 8. The first correction coefficient calculation map is made conform in to each engine 1 through experiments in advance and the like.

Figure 9:
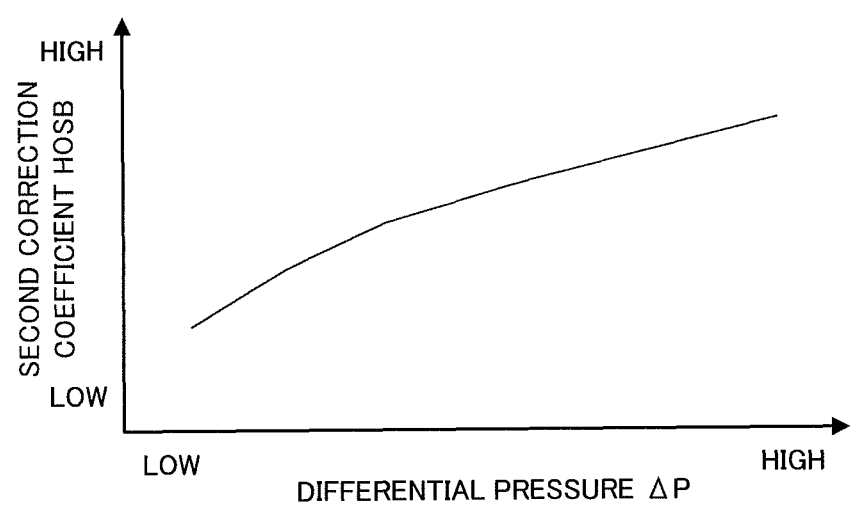
FIG. 9 is a view illustrating the relationship between the differential pressure, between the fuel pressure and the intake pressure, and a second correction coefficient.

Furthermore, the low flow rate region correction coefficient calculation unit 241 calculates the second correction coefficient HOSB by referring to a second correction coefficient calculation map of FIG. 9. The second correction coefficient calculation map is stored in the ROM of the controller 90.

As illustrated in FIG. 9, the second correction coefficient HOSB is set to be higher as the differential pressure ΔP becomes higher. FIG. 9 shows an example of the second correction coefficient calculation map, and it is possible to use a second correction coefficient calculation map of which characteristics are different from those of FIG. 9. The second correction coefficient calculation map is made conform to each engine 1 through experiments in advance and the like.

As illustrated in FIG. 3, the post-correction request pulse width calculation unit 242 in the pulse correction unit 240 calculates the post-correction request pulse width CTI' based on thus-calculated first correction coefficient HOSA and second correction coefficient HOSB, and the request pulse width CTI calculated by the request pulse width calculation unit 230. Similarly to the above-described expression (1), the post-correction request pulse width calculation unit 242 multiplies the request pulse width CTI by the first correction coefficient HOSA, and adds the second correction coefficient HOSB to the multiplied value, to calculate the post-correction request pulse width CTI'.

Thus, according to this embodiment, the pulse width correction in the low flow rate region is executed by giving consideration to the pressure state applied to the fuel injection valve 71, that is, the differential pressure ΔP between the fuel pressure and the intake pressure.

The controller 90 is further provided with a minimum pulse width calculation unit 270 for calculating a minimum pulse width Tmin that can be set with respect to the fuel injection valve 71 according to the differential pressure ΔP.

Figure 10:
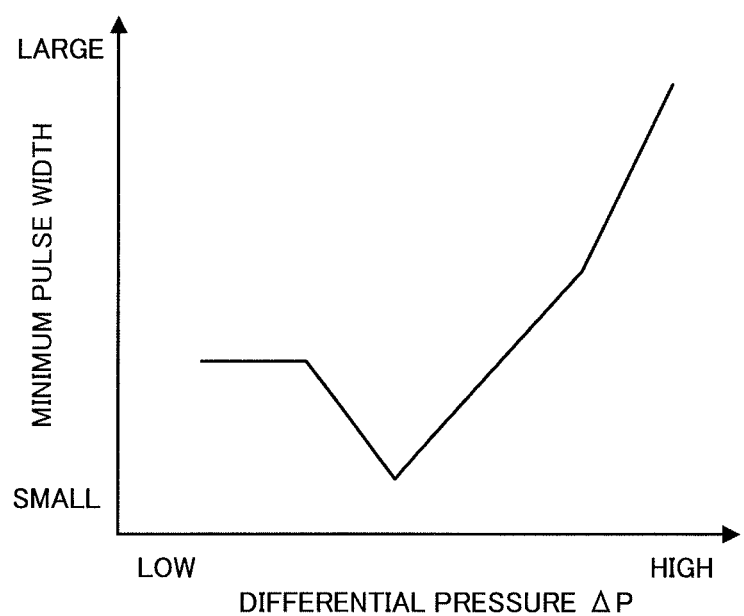
FIG. 10 is a view illustrating the relationship between the differential pressure, between the fuel pressure and the intake pressure, and a minimum pulse width.

The minimum pulse width calculation unit 270 determines the minimum pulse width Tmin by referring to a minimum pulse width calculation map of FIG. 10. The minimum pulse width calculation map is stored in the ROM of the controller 90. FIG. 10 shows an example of the minimum pulse width calculation map, and it is possible to use a minimum pulse width calculation map of which characteristics are different from those of FIG. 10. Incidentally, the controller 90 can be realized without the minimum pulse width calculation unit 270.

As illustrated in FIG. 3, the target pulse width setting unit 250 sets the target pulse width CTIF based on the post-correction request pulse width CTI' that is calculated by the post-correction request pulse width calculation unit 242, the request pulse width CTI that is calculated by the request pulse width calculation unit 230, and the minimum pulse width Tmin that is calculated by the minimum pulse width calculation unit 270. Specifically, the target pulse width setting unit 250 sets, as the target pulse width CTIF, the largest value among the post-correction request pulse width CTI', the request pulse width CTI and the minimum pulse width Tmin.

The fuel injection valve 71 is controlled by thus set target pulse width CTIF, and the fuel is supplied into the intake manifold 51.

As described above, the target pulse width setting unit 250 in the controller 90 sets the target pulse width CTIF based on the request pulse width CTI, the post-correction request pulse width CTI' and the like. However, when the low flow rate region correction coefficient calculation unit 241 outputs the first correction coefficient HOSA as "1" and outputs the second correction coefficient HOSB as "0" in the region other than the low flow rate region, the target pulse width setting unit 250 can set the target pulse width CTIF based on the post-correction request pulse width CTI' only.

The following effects can be obtained by the above-described fuel injection control device 100 of the engine 1.

The fuel injection control device 100 of the engine 1 is provided with the fuel injection valve 71 that injects the fuel into the intake passage according to the target pulse width, and the fuel pump 74 that controls the fuel pressure supplied to the fuel injection valve 71 depending on the engine operation state. In the fuel injection control device 100, the request pulse width calculation unit 230 calculates the request pulse width based on the intake flow rate, the pressure of the fuel supplied to the fuel injection valve 71, and the differential pressure between the fuel pressure and the intake pressure inside the intake manifold 51, and the post-correction request pulse width calculation unit 242 calculates the post-correction request pulse width by correcting the request pulse width according to the differential pressure, when injecting the fuel in a flow rate lower than the predetermined reference flow rate. Then, the target pulse width setting unit 250 in the fuel injection control device 100 sets the target pulse width based on the post-correction request pulse width. Specifically, the target pulse width setting unit 250 sets, as the target pulse width, the greater one between the post-correction request pulse width and the pre-correction request pulse width.

Thus, in this embodiment, as the engine 1 is supposed to make injection of the fuel into the intake passage, and the fuel pressure supplied to the fuel injection valve 71 is controlled by the fuel pump 74 according to the engine operation state, it is possible to realize the appropriate fuel injection with regard to the engine operation state. Furthermore, as the pulse width correction in the low flow rate region is executed by giving consideration to the pressure state applied to the fuel injection valve 71, that is, the differential pressure between the fuel pressure and the intake pressure, the fuel injection control can be performed in the optimum manner even when the fuel pressure or the intake pressure changes, and deterioration in the fuel consumption performance and the exhaust performance in the low flow rate region can be controlled.

With the engine 1 that makes injection of the fuel into the intake passage, the pressure of the fuel to be supplied to the fuel injection valve 71 becomes higher as the engine rotation speed becomes faster and the engine load becomes higher with regard to the engine operation state. This makes it possible to facilitate atomization of the fuel, and to make injection of the predetermined amount of the fuel without leaving the fuel unused, even at the high engine rotation speed and the high engine load. As a result of this, it is possible to realize the fuel injection more appropriately according to the engine operation state.

The fuel injection control device 100 is further provided with the low flow rate region correction coefficient calculation unit 241 that calculates the first correction coefficient and the second correction coefficient, for correcting the request pulse width, based on the differential pressure. The post-correction request pulse width calculation unit 242 calculates the post-correction request pulse width by multiplying the request pulse width by the first correction coefficient and adding the second correction coefficient to the multiplied value. As the two correction coefficients are used like this, it is possible to correct the request pulse width with ease and with accuracy.

The request pulse width calculation unit 230 in the fuel injection control device 100 calculates the request pulse width by adding the effective pulse width that is calculated based on the intake flow rate, the fuel pressure, and the differential pressure, to the ineffective pulse width that is calculated based on the differential pressure and the battery voltage. As the calculation of the effective pulse width and the ineffective pulse width is carried out by giving consideration to the differential pressure between the pressure of the fuel to be supplied to the fuel injection valve 71 and the pressure of the intake air inside the intake manifold 51, it is possible to realize the fuel injection more appropriately according to the engine operation state The embodiment of the present invention has been explained thus far. However, the above-described embodiment is only a part of application examples of the present invention, and is not intended to limit the technical scope of the present invention to the concrete structure of the above-described embodiment.

What is claimed is:

1. A fuel injection control device of an engine for controlling an injection amount of fuel, comprising:
   a fuel injection valve configured to inject a fuel according to a target pulse width into an intake passage;
   an intake flow rate detection unit arranged to detect a flow rate of an intake air supplied to the engine;
   an intake pressure detection unit arranged to detect an intake pressure in the intake passage;
   a fuel pressure detection unit arranged to detect a pressure of a fuel supplied to the fuel injection valve;
   a pressure control unit configured to control the fuel pressure according to an engine operation state;
   a request pulse width calculation unit configured to calculate a request pulse width on the basis of an intake flow rate detected by the intake flow rate detection unit, a fuel pressure detected by the fuel pressure detection unit, and a differential pressure between the fuel pressure and an intake pressure detected by the intake pressure detection unit;
   a post-correction request pulse width calculation unit configured to calculate a post-correction request pulse width through correcting the request pulse width according to the differential pressure, when injecting a fuel of which flow rate is lower than a predetermined flow rate; and
   a target pulse width setting unit configured to set the target pulse width on the basis of the post-correction request pulse width.

2. The fuel injection control device of the engine according to claim 1, further comprising
   a correction coefficient calculation unit configured to calculate a first correction coefficient and a second correction coefficient for correcting the request pulse width on the basis of the differential pressure,
   wherein the post-correction request pulse width calculation unit multiplies the request pulse width by the first correction coefficient, and adds the second correction coefficient to a multiplied value, to calculate the post-correction request pulse width.

3. The fuel injection control device of the engine according to claim 1,
   wherein the request pulse width calculation unit adds an effective pulse width that is calculated on the basis of the intake flow rate, the fuel pressure and the differential pressure, and an ineffective pulse width that is calculated on the basis of the differential pressure and a battery voltage, to calculate the request pulse width.

4. The fuel injection control device of the engine according to claim 1,
   wherein the target pulse width setting unit sets, as the target pulse width, a greater one of the post-correction request pulse width and the request pulse width.

5. The fuel injection control device of the engine according to claim 1,
   wherein the pressure control unit is configured to increase the fuel pressure as an engine rotation speed becomes faster and an engine load becomes higher, with regard to the engine operation state.

6. A fuel injection control method of an engine for controlling an injection amount of fuel, the engine having a fuel injection valve that is configured to inject a fuel according to a target pulse width into an intake passage, the fuel injection control method comprising:
   an intake flow rate detection process in which a flow rate of an intake air supplied to the engine is detected;
   an intake pressure detection process in which an intake pressure in the intake passage is detected;
   a fuel pressure detection process in which a pressure of a fuel supplied to the fuel injection valve is detected;
   a pressure control process in which the fuel pressure is controlled according to an engine operation state;
   a request pulse width calculation process in which a request pulse width is calculated on the basis of an intake flow rate detected in the intake flow rate detection process, a fuel pressure detected in the fuel pressure detection process, and a differential pressure between the fuel pressure and an intake pressure detected in the intake pressure detection process;
   a post-correction request pulse width calculation process in which a post-correction request pulse width through correcting the request pulse width according to the differential pressure, when injecting a fuel of which flow rate is lower than a predetermined flow rate; and a target pulse width setting process in which the target pulse width is set on the basis of the post-correction request pulse width.

* * * * *